United States Patent [19]

Belikov et al.

[11] 4,439,702
[45] Mar. 27, 1984

[54] ELECTRIC MOTOR HAVING HELICAL STATOR

[75] Inventors: Viktor T. Belikov; Anatoly D. Ivlev; Viktor G. Chelak, all of Odessa, U.S.S.R.

[73] Assignee: Odessky Politekhnichesky Institut, Odessa, U.S.S.R.

[21] Appl. No.: 385,388

[22] PCT Filed: Sep. 29, 1980

[86] PCT No.: PCT/SU80/00165
§ 371 Date: May 20, 1982
§ 102(e) Date: May 20, 1982

[87] PCT Pub. No.: WO82/01286
PCT Pub. Date: Apr. 15, 1982

[51] Int. Cl.$^3$ .............................................. H02K 7/06
[52] U.S. Cl. ............................................ 310/80; 310/12
[58] Field of Search ...................................... 310/12, 80

[56] References Cited

U.S. PATENT DOCUMENTS 3,824,420  7/1974  Marinus et al. ................. 310/12 X
3,889,165  6/1975  Van ................................. 310/12 X
3,898,487  8/1975  Sobiepanek et al. ............ 310/12 X
4,197,488  4/1980  Kant ................................. 310/12 X

FOREIGN PATENT DOCUMENTS 945225  of 0000  United Kingdom .
64142   of 0000  U.S.S.R. .

Primary Examiner—Donovan F. Duggan
Attorney, Agent, or Firm—Lilling & Greenspan

[57] ABSTRACT

An electric motor comprises a stator provided with a helical magnetic core within whose grooves is laid an armature winding, and a rotor disposed within a stator boring. The rotor is provided with salients for forming a main magnetic field, disposed therearound along a helical line, the length of the salients being equal to $\alpha\delta\tau$, and the distance therebetween being $(2-\alpha\delta)\tau$, where $\alpha\delta$ is a coefficient of a rated pole arc, and $\tau$ is a pole pitch of the motor. According to the invention, in the magnetic core is provided an additional groove wherein is laid an excitation winding, the portions of each turn of the magnetic core whereon the armature winding and the excitation winding are disposed have such a length which ensures axial alignment of the grooves for placing the armature winding within all the turns of the magnetic core.

6 Claims, 16 Drawing Figures

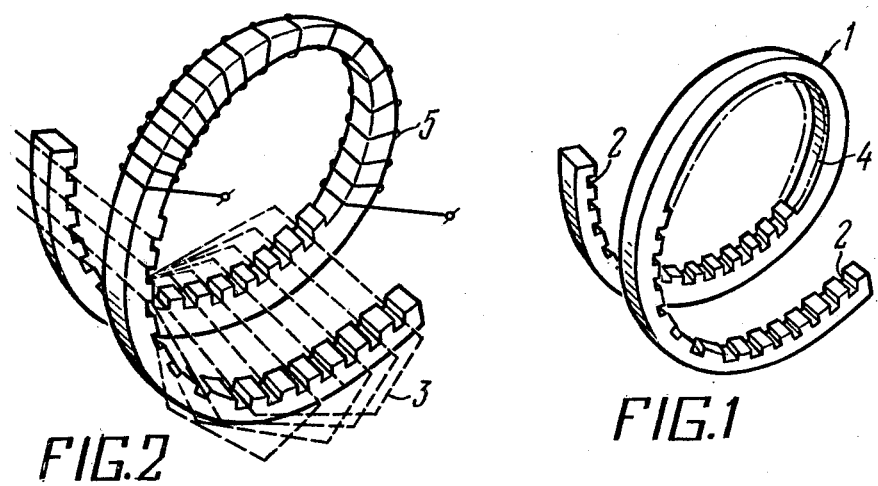
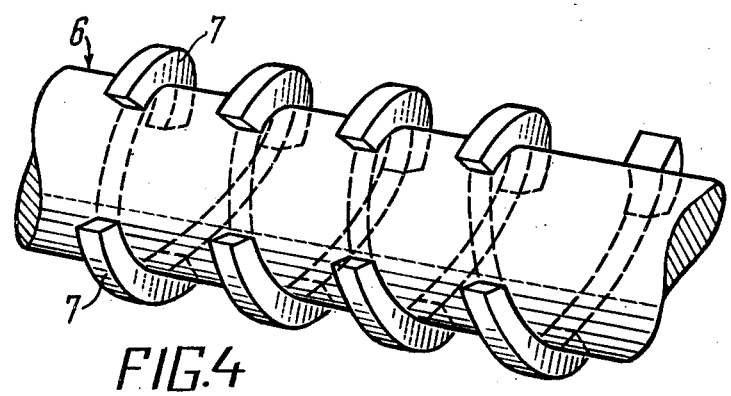

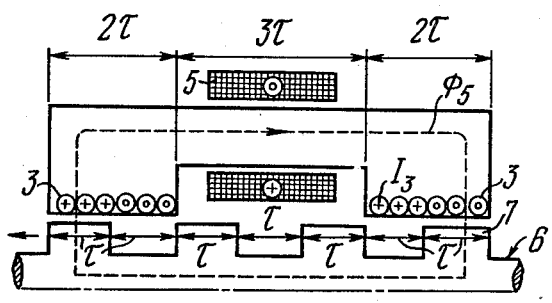
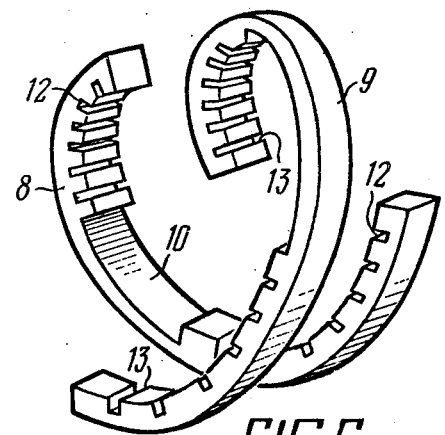
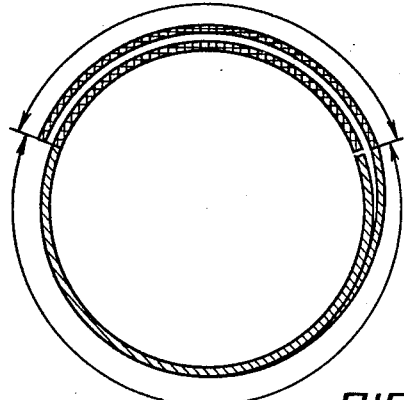
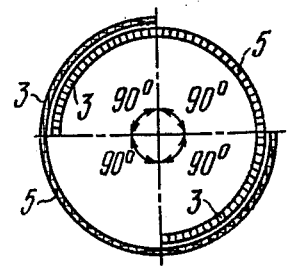
FIG.5
FIG.6
FIG.3
FIG.7

ELECTRIC MOTOR HAVING HELICAL STATOR

FIELD OF THE INVENTION

The invention relates to electric machines and particularly concerns electric motors having a helical stator.

DESCRIPTION OF THE PRIOR ART

Known in the art is an electric motor (British Pat. No. 945,225 Nat.Cl. H2A, Published Dec. 23, 1963) allowing helical movement of the rotor to be effected. In this motor, a stator carrying a polyphase armature winding has the form of a hollow cylinder provided with helical grooves on the inner surface thereof. The rotor of the motor, disposed within a stator bore, is constructed in the form of a cylinder and is further provided with helical grooves and salient poles forming the main magnetic field.

When the winding is connected to an a.c. power supply, the rotor moves helically. The speed of this movement is determined by the frequency of the terminal voltage, which frequency is selected to be relatively low, e.g. such that the motor make 1 r.p.m. If the windings are connected to a d.c. power supply, the rotor will be held in a fixed position due to the presence of salient poles. To achieve a required position of the rotor, the frequency must be lowered gradually or suddenly to zero.

In the case where the winding is supplied with a three-phase alternating current, a rotatory magnetic field is formed, in which field the rotor starts to synchronously rotate since it is provided with salient poles. Simultaneously, the helical grooves of the rotor are set along the helical grooves of the stator, thereby resulting in the movement of the rotor also along the axis in the direction which depends on the direction of rotation.

However, the motors of the above type are characterized by inherent shortcomings caused by low adjusting properties of a.c. electric machines operating from an industrial feeding voltage network, said shortcomings consisting mainly in that the range of monitoring a frequency of rotation thereof is narrow, and therefore the range of monitoring the speed of helical movement of the rotor in the given device is narrow as well.

Frequency regulators of the feeding voltage, acceptable for industrial use and allowing the frequency of rotation of synchronous and asynchronous motors to be continuously controlled, have not at present left experimental studies.

SUMMARY OF THE INVENTION

The invention provides an electric motor which ensures a helical movement of a driven working member of an industrial mechanism, due to a special formation of excitation and control magnetic fields and continuous control of linear speed of the latter, and would allow the range of monitoring the speed of the helical movement to be expanded.

The problem set forth is solved by an electric motor, comprising a stator provided with a helical magnetic core within whose grooves is laid an armature winding, and a rotor disposed within a stator bore and provided with salients for forming a main magnetic field, disposed around the rotor along a helical line, the length of the salients being equal to $\alpha\delta.\tau$, and the distance therebetween being $(2-\alpha\delta).\tau$, where $\alpha\delta$ is a coefficient of a rated pole arc, and $\tau$ is a pole pitch of the motor. According to the invention, in the magnetic core is provided an additional groove wherein is laid an excitation winding, the portions of each turn of the magnetic core whereon an armature winding and an excitation winding are disposed have a length which ensures axial alignment of the grooves for placing the armature winding within all the magnetic core turns. The salients forming the main magnetic field have a length which is equal to the pole pitch of the motor and are disposed at a distance from one another which is equal to the pole pitch of the motor.

Such an arrangement of the motor makes it possible to accomplish continuous control of the helical movement of the rotor, and consequently of a working member of an industrial mechanism driven by this motor, said control being carried out by changing the feeding voltage either of the armature winding or of the excitation winding. The above motor, possessing high monitoring properties of a direct current electric machine, allows the speed of the rotor movement to be controlled within a wide range.

It is expedient to construct the motor of the invention in such a manner that a region of each turn of the magnetic core, whereon the armature winding is disposed, has a length equal to an even number of pole pitches, and a region of each turn of the magnetic core, whereon the excitation winding is disposed, has a length equal to an odd number of pole pitches of the motor.

In the case where it is required to compensate for a force of one-side magnetic attraction of the rotor, it is reasonable to provide the stator with an additional helical magnetic core which is identical to the main magnetic core. Both these magnetic cores are to be so disposed as to compensate for the forces of one-side magnetic attraction between the rotor and the stator. Longitudinal axes of the grooves for placing the armature winding are to coincide in both the magnetic cores. Additional salients must be provided on the rotor, identical to the main salients and disposed relative thereto in the same manner as mutually disposed main and additional magnetic cores of the stator.

An increase in an electromagnetic force developed by the motor can be achieved in the case where the magnetic core of the stator is provided with two turns whereon are located $4n(n=4,6,8,10...)$ pole pitches of the motor. The grooves designed for the excitation winding are provided on middle regions of the magnetic core, whose length is a multiple of four pole pitches of the motor. The armature winding is to be laid on two extreme regions of each of the two turns of the stator magnetic core, the length of said regions being the same.

Further improvement of the power characteristics of the motor may be achieved by mounting a non-magnetic separator in the middle portion of the stator magnetic core.

In the cases where it is necessary to reduce the consumption of active materials, it is expedient to construct the motor of the invention in such a manner that each of the stator magnetic cores have a length equal to half a circumference. The additional groove, wherein is laid an excitation winding common for both the magnetic cores, is provided longitudinally in each magnetic core. The grooves of the armature winding are provided over the whole inner surface of the stator magnetic cores. The main salients on the rotor are shifted relative to the additional salients along the helical line in such a manner that, in the case of matching the helical lines along which the salients are disposed, the additional salients are located between the main salients.

The above described arrangement of the motor of the invention also ensures an increase in the evenness of the rotor running.

BRIEF DESCRIPTION OF THE DRAWING

The invention is further explained in terms of a detailed description of embodiments thereof with reference to the accompanying drawings, in which:

FIGS. 1 and 2 are perspective views, showing a magnetic core of the stator provided with grooves for laying the armature winding and the excitation winding of the invention;

FIG. 3 shows a specific modification of the arrangement of the armature winding and the excitation winding on the turns of the magnetic core;

FIG. 4 is a perspective view, showing a rotor of the motor of the invention;

FIG. 5 shows a view of the stator and rotor of the motor of the invention;

FIG. 6 is a perspective view, showing a modification of the arrangement of the stator, ensuring the compensation of the magnetic attraction forces of the rotor;

FIG. 7 is an end view of the motor, showing relative lengths of the regions of the magnetic cores, shown in FIG. 6, according to the invention;

DETAILED DESCRIPTION OF THE INVENTION

Figure 8:
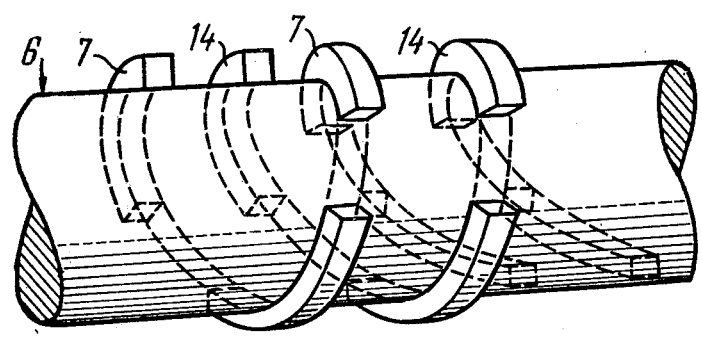
FIG. 8 is a perspective view, showing the rotor of the motor of the invention, intended for the use in combination with the stator illustrated in FIG. 6.

Referring to FIG. 1, the electric motor of the invention comprises a stator provided with grooves within a helical magnetic core 1 thereof. The grooves 2 are designed for disposing therewithin an armature winding 3 (FIG. 2) and are so constructed that each of the grooves 2 in a previous turn of the magnetic core is a continuation of one of such grooves in a subsequent turn. Each turn of the magnetic core 1 (FIG. 1) of the stator is practically divided into two regions: the first of said regions is occupied by the grooves 2, while the second is occupied by an additional groove 4 designed for laying an excitation winding 5 (FIG. 2) thereinto. For greater clarity of representation, the dashed line shows the inner surface of the magnetic core 1 (FIG. 1) in the absence of the groove 4.

The lengths of the regions of the magnetic core, whereon are disposed the excitation winding and the armature winding, can be varied, but in all the embodiments of the motor of the invention their relative magnitudes are to be such as to maintain the axial alignment of the grooves designed for the armature winding.

In the disclosed embodiment of the invention, the length of a region of each turn of the magnetic core 1, whereon the armature winding 3 is disposed, is selected to be equal to an even number of pole pitches $\tau$ of the motor, and the length of the region of the magnetic core 1, whereon is disposed the excitation winding 5, is selected to be equal to an odd number of pole pitches $\tau$. FIG. 3 illustrates a specific modification of the location of the windings 3 and 5 on the magnetic core, according to which modification on a region which is limited by an angle of 144° ($\tau=72°$) is laid the armature winding 3, while on a region which is limited by an angle of 216° is laid the excitation winding 5.

The armature winding 3 is constructed in accordance with the diagrams of armature windings of linear d.c. motors and is connected either to commutator plates of an electromechanical commutator or to corresponding channels of a semiconductor commutator (not shown). Due to the fact that the grooves 2 designed for the armature winding 3 in the above described embodiment of the magnetic core 1 are disposed opposite one another in all the turns thereof, one armature winding is utilized in the electric motor of the invention, which permits, depending on the magnitude of the pitch of an imaginary helical line whereon the magnetic core is disposed, the achievement of 1.5 to 3.5 times' decrease in the volume of frontal portions of this winding and a corresponding reduction in the weight of the armature winding as against the employment of separate armature windings by 25 to 30%.

A rotor 6 (FIG. 4) of the electric motor in accordance with the present invention is a cylindrical body made of a ferromagnetic material and is disposed within a stator bore, i.e. is embraced by the magnetic core 1. On the side surface of the rotor 6 are provided salients 7 disposed along the helical line around the rotor. These salients are also ferromagnetic and may be constructed in a conventional manner, e.g. by mounting separately manufactured lengths of a helical thread having a rectangular cross-section, within a helical distance slot turned down in the rotor body. The length of each salient 7 in the described embodiment is equal to one pole pitch $\tau$ of the motor, $\alpha\delta=1$, and the distances between said salients in the direction of the helical line are also equal to $\rho$. The salients 7 are designed for forming the main magnetic field in the running motor. This function of the salients will be further considered in greater detail.

The motor of the above described design operates as follows.

In the case where the rotor 6 (FIG. 5), while being located within the stator boring, occupies such a position in which the salients 7 thereof are located on the opposite ends of the region of the magnetic core 1 provided with the armature winding 3, and the commutator (either electromechanical or semiconductor) has connected said winding to a feeding network, thereby ensuring the flow of $I_3$ currents above the salients 7 of the rotor 6, shown in this figure, with the supply of power to the excitation winding 5 the pole salients 7 will concentrate the main magnetic flux $\phi_5$ within the areas of the armature winding 3 where $I_3$ currents flow in such a direction that their electromagnetic interaction with the flux $\phi_5$ will ensure the development of a tractive force having one direction. Under the action of this force the rotor starts moving to the left along the helical line. The direction of the rotor movement is shown by the arrow. With the helical movement of the rotor 6, which has started under the action of this force, the commutator connects the sections of the armature winding 3 in such a manner that the direction of the electromagnetic force be maintained unchangeable. Monitoring the speed of movement of the rotor of the motor of the invention is accomplished like in the prior art d.c. electric machines, i.e. by changing the supply voltage, or by varying the excitation current, or by connecting an additional active resistance into the circuit of the armature winding 3. To reverse the motor, it is necessary to change the feeding polarity either of the armature winding 3, or of the excitation winding 5.

Also possible is another embodiment of the electric motor of the invention, wherein is achieved the compensation of the force of one-sided magnetic attraction between the rotor 6 and the stator.

Referring now to FIG. 6, the stator of the motor comprises two identical helical magnetic cores 8 and 9. These magnetic cores are disposed like the threads of a double helical thread, the beginnings of these threads being disposed on the ends of the diameter of an imaginary cylinder whereon said thread is cut. The length of both the magnetic cores 8 and 9 constitutes an even number of pole pitches $\tau$.

In this embodiment of the invention, a large groove 10 is provided in the middle portion of the magnetic core 8 for placing the excitation winding 5. A large groove 11 is provided for the same purpose correspondingly in the middle portion of the magnetic core 9. On both sides of the grooves 10,11 in the direction of a screw on each magnetic core are disposed regions of equal lengths for placing the armature winding 3. This winding is laid into grooves 12 of the magnetic core 8, and grooves 13 of the magnetic core 9. Similar to the above described embodiment of the invention, the axes of these grooves are aligned or at least are so close to one another that the armature winding 3 may be laid thereinto, said winding being common for both the magnetic cores. Such an arrangement makes it possible to reduce 2 to 4 times the consumption of copper required for the manufacture of the frontal portions of the winding as compared to the use of the armature windings which are separate for each magnetic core.

In the described embodiment of the invention it is expedient that the lengths of the regions of each of the magnetic cores, whereon are placed the armature winding 3 and the excitation winding 5, be selected equal, each having two pole pitches of the motor. Thus, along the helical line each of the magnetic cores 8 and 9 has a length equal to six pole pitches of the motor, which is illustrated in FIG. 7.

It is preferred that the length of the magnetic cores 8 and 9 along the helical line be equal to ¾ of the complete turn, i.e. 270° along the circumference.

On the rotor 6 (FIG. 8) are provided additional salients 14 identical to the salients 7. The salients 7 and 14 are disposed relative one another similarly to the mutual position of the magnetic cores 8 and 9. The pitch of the helical line whereon are disposed the salients 14 is equal to the pitch of the helical lines whereon are disposed both the magnetic cores 8 and 9.

The salients 7 are located within the boring of the magnetic core 8, and the salients 14 are disposed within the boring of the magnetic core 9. To minimize the values of leakage fluxes, the height of the helical salients 7 and 14 is selected within the range of $(10-15)\delta$, where $\delta$ is a one-sided air gap of the motor.

Figure 9:
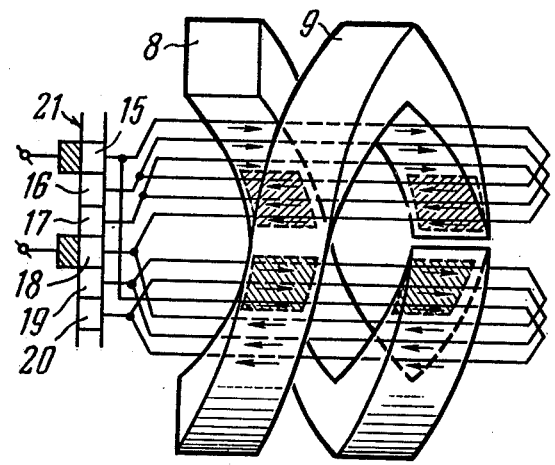
FIG. 9 is a perspective view, showing the operation of the motor of the invention, whose stator and rotor are shown in FIGS. 6,7 and 8.

The operation of the motor of the above described embodiment of the invention can be explained in terms of FIG. 9 in which are schematically illustrated the magnetic cores 8 and 9 provided with the armature winding connected to plates 15,16,17,18,19, and 20 of an electromechanical commutator 21. In this figure the portions of the surfaces, corresponding to the location of the helical salients 7,14 of the rotor under the magnetic cores 8 and 9, are hatched.

When the current flows to the left along conductors 22,23 and 24 of the armature winding 3, the position of the commutator brushes being as shown in FIG. 9, and to the right along conductors 25,26 and 27, and when the excitation winding is so connected that in the region of the conductors 22,23 and 24 of both the magnetic cores 8 and 9 the excitation flux is directed away from an observer, and in the region of the conductors 25,26 and 27 said flux is directed towards an observer, the helical salients of the rotor, disposed in the region of the conductors 22,23 and 24, are subjected in accordance with the Biot-Savart-Laplace's law to the action of an electromagnetic force directed counter-clockwise; similarly is directed a force acting on the helical salients disposed in the region of the conductors 25,26 and 27 of the stator. Under the action of these forces occurs a torque of the motor, moving helically the rotor 7 thereof. With a helical rotation of the rotor, which has begun under the action of this torque, the commutator switches the sections of the armature winding in such a manner that the direction of the torque is maintained unchangeable.

Speed control of the motor constructed in accordance with the above described embodiment of the invention is accomplished as described above, i.e. in a conventional manner.

To reverse the motor, it is necessary to invert either the polarity of the armature winding 3, or that of the excitation winding 5.

Figure 10:
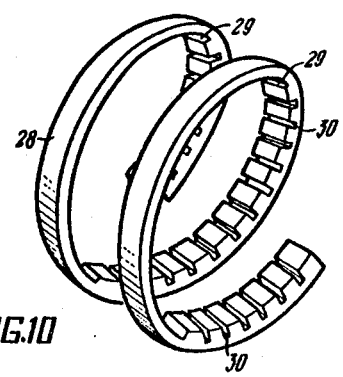
FIG. 10 is a perspective view, showing a magnetic core of another modification of the motor of the invention.

When it is required to increase an electromagnetic force developed by the motor of the invention, it is expedient to use the next embodiment of the invention, illustrated in FIG. 10.

The stator of the motor comprises one helical magnetic core 28 having a rectanglar cross-section. This magnetic core is so constructed that on both sides of grooves 29, whose length along the helical line is equal to 4n (where n=4,6,8,10 . . . ) and which serve for placing the excitation winding 5 therewithin, two regions are disposed, each having a length which is a multiple of $4\tau$ and designed for placing the armature winding 3 and provided with grooves 30. The length of the magnetic core 28 is so selected that it has two turns around the rotor 6.

Under the condition that the armature winding 3 is constructed from the sections which are common for both the regions of the magnetic core 28, each of said regions being a multiple of $4\tau$, it is necessary that opposite each groove 30 of one region one of the grooves 30 of the other region is disposed. The currents flowing within the conductors of the armature winding 3, laid within these grooves, must have the same direction. It is obviously for this purpose, as shown in FIG. 10, that the regions for placing the armature winding 3 and the region for placing the excitation winding 5 are to be disposed within the limits of one turn of the magnetic core, i.e. within the limits of 360° along the circumference if viewed from the end face of the motor.

The rotor 6 in the given modification is similar to the rotor of the first above described embodiment thereof, and is provided only with the salients 7. The length of each of these salients and the distance between the adjacent salients, measured along the helical line, are also equal to the pole pitch $\tau$ of the motor. The height of the salients 7 is such that it ensures maximum engagement with the magnetic excitation flux of the stator, for which said height is selected within the range of $(10-15)\delta$.

Figure 11:
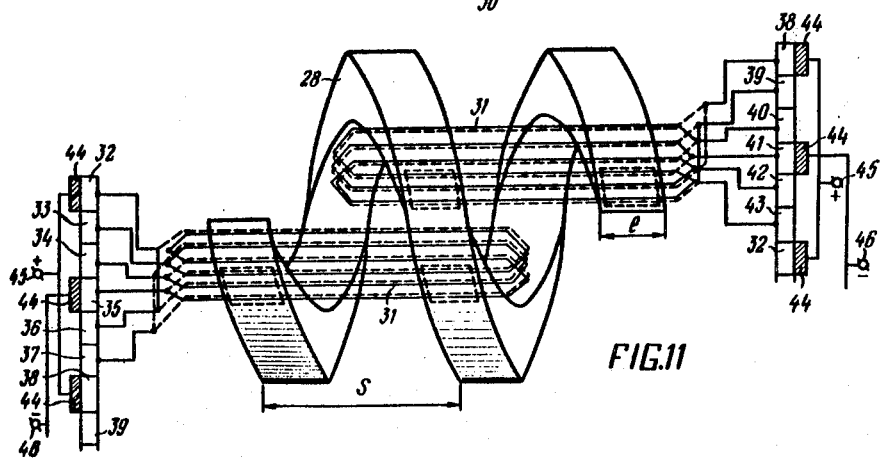
FIG. 11 schematically shows laying the sections of the armature winding, embracing the turns of the magnetic core shown in FIG. 10.

Referring to FIG. 11, the regions of both the turns of the magnetic core 28 provided with the grooves 30 are embraced by the sections of the armature winding 3 which is common therefore. Conductors 31 of these sections are so disposed that the force developed by the motor is maintained unchangeable. Commutator plates 32,33,34,35,36,37,38,39,40,41,42 and 43 form a cylindrical commutator, and for series switching of corresponding sections two pairs of brushes 44 are designed, said brushes being electrically connected to the power supply of the motor, whose terminals 45 and 46 are shown in the figure.

Figure 12:
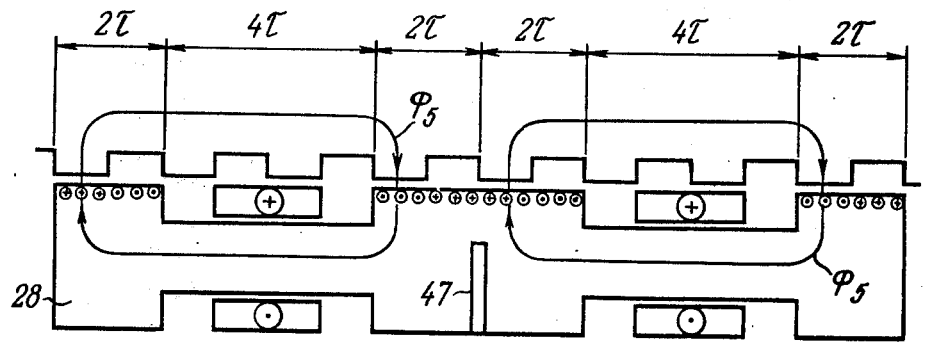
FIG. 12 illustrates the embodiment of FIG. 10 in combination with means eliminating the passage of a magnetic flux between the turns of the magnetic core.

To improve the power characteristics by reducing the leakage fluxes between the turns of the magnetic core 28, a non-magnetic separator 47 can be installed (FIG. 12), said separator eliminating the passage of the magnetic flux at this region in the longitudinal direction.

Figure 13:
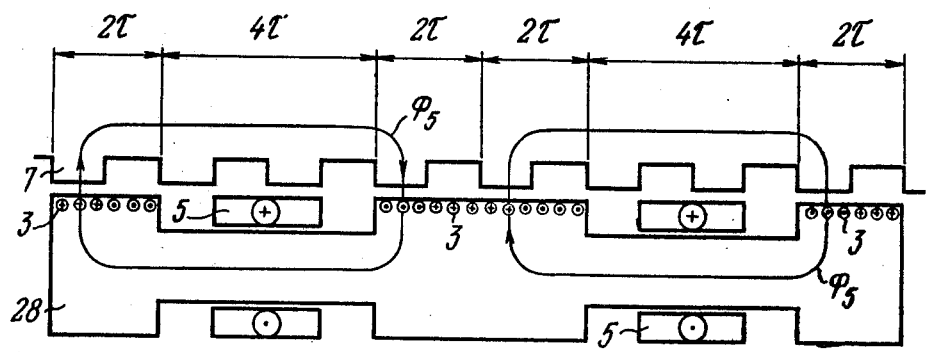
FIG. 13 illustrates the operation of a motor whose main units are shown in FIGS. 10,11,12.

The operation of the above described modification of the motor can be illustrated by FIG. 13. In this figure, the motor is schematically represented as a motor developed into a linear one. The regions of the magnetic core 28, designed for placing the armature winding 3, have a length $l_1=2\tau$, and the regions of this magnetic core, designed for placing the excitation winding 5, have a length $l_2=4\tau$. The total length, L, of the magnetic core, also expressed in terms of pole pitches, is equal to 16 (720°). In the case where the rotor 6, while being disposed within the boring of the stator, occupies e.g. such a position in which the salients 7 thereof having a length of $\tau$ are located on the opposite ends of the regions of the magnetic core 28 provided with the armature winding 3, and the electromechanical commutator has connected said winding to the power supply, having thereby ensured the flow of currents under the salients 7 of the rotor as illustrated in FIG. 13, then in accordance with Biot-Savart-Laplace's law there occurs an electromagnetic force shifting both the salients 7 of the rotor to the left. With a helical rotation of the rotor, which has begun under the action of this force, the commutator switches the sections of the armature winding in such a manner that the direction of this electromagnetic force is maintained unchangeable.

Speed control and reversing the motor are accomplished similarly as described above.

A further decrease in the consumption of active materials and an increase in the evenness of the rotor running can be achieved by the use of still another embodiment of the invention.

Figure 14:
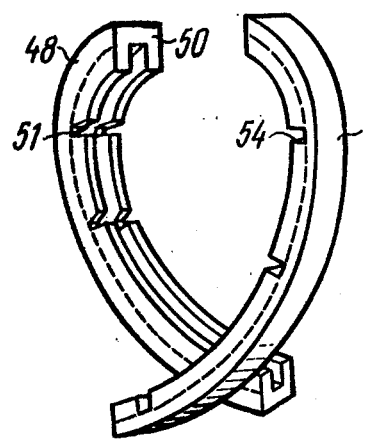
FIG. 14 is a perspective view, showing a stator of another embodiment of the motor of the invention.

According to this embodiment, the motor stator comprises two helical magnetic cores 48 and 49 (FIG. 14) of a U-shaped cross-section, the length of each core being equal to half a turn, and each core being provided with a longitudinal helical groove 50 wherein is laid the excitation winding 5 which is common for these magnetic cores. Grooves 51 intended for the armature winding 3, are provided along the whole length of each magnetic core. The longitudinal axes of these grooves, provided in different magnetic cores, are aligned.

In the described motor along each magnetic core $2p\cdot\tau$ pole pitches can be laid, where p is the number of pole pairs of the motor. The number of pole pitches of the armature winding is a multiple of $2\tau$. Since the magnetic cores 48 and 49 together occupy an angle of 360°, it is possible to employ a conventional design of a drum electromechanical commutator.

Figure 15:
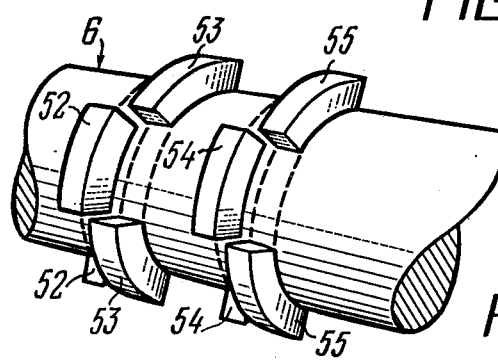
FIG. 15 is a perspective view, showing the rotor of the motor whose stator is illustrated in FIG. 14.

The rotor 6 of the motor is depicted in FIG. 15. It is made of a ferromagnetic material and has the form of a cylinder whereon are disposed, along helical lines, four rows of salients forming the main magnetic field. As shown in FIG. 15, salients 52 and 53, forming the first two rows, are shifted along the helical line relative one another in such a manner that in the alignment of these helical lines the salients 52 be located between the salients 53. Similarly are disposed salients 54 and 55 forming the remaining two rows of salients. All the above listed salients are disposed inside the helical surfaces of the magnetic cores 48 and 49 carrying the armature winding. The total width of the salients 52 and 53 and that of the salients 54 and 55 measured along the longitudinal axis of the motor is equal to the width of the regions of the magnetic cores 48 and 49 provided with grooves 51. Said salients 52,53,54, and 55 have a length, measured along the helical line, equal to $\alpha\delta.\tau$, where $\alpha\delta$ is a coefficient of a rated pole arc. The distance between the salients 52, like that between the salients 53 etc. is $(2-\alpha\delta)\tau$. The distance between the inner surfaces of the salients 52 and 53, like that between the inner surfaces of the salients 54 and 55, is equal to the width of the groove 51 which is occupied by the excitation winding.

Figure 16:
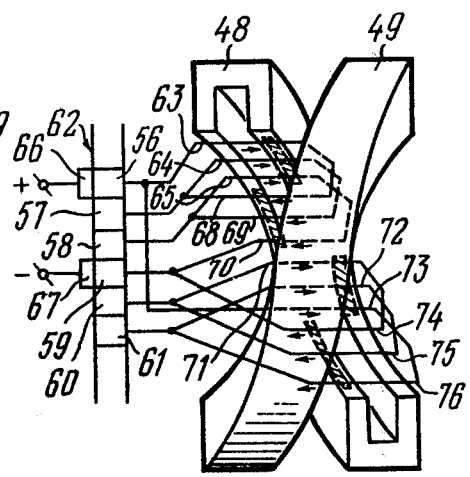
FIG. 16 illustrates the operation of the motor of the invention, whose units are shown in FIGS. 14,15.

The operation of this modification of the motor is illustrated in FIG. 16 which shows schematically the magnetic cores 48 and 49 provided with the armature winding 3 connected to plates 56,57,58,59,60 and 61 of an electromechanical commutator 62. In this figure hatched portions of the magnetic core surfaces correspond to the helical salients of the rotor disposed thereunder.

When the current flows to the right along conductors 63,64 and 65 of the winding 3, the position of brushes 66 and 67 on the commutator 62 being as shown in FIG. 16, and to the left along conductors 68,69 and 70, and when the excitation winding is so connected that in the region of the conductors 63,64 and 65 the excitation flux is directed towards an observer, and in the region of the conductors 68,69 and 70 said flux is directed correspondingly away from an observer, the rotor salients disposed in the region of the conductors 63,64, and 65, are subjected in accordance with Biot-Savart-Laplace's law to the action of an electromagnetic force directed counter-clockwise; similarly is directed a force acting on the salients located in the region of the conductors 68,69 and 70. The similar order of occurence of electromagnetic forces is observed under the action of currents flowing in conductors 71,72,73, 74,75, and 76. Under the action of these forces occurs a torque of the motor, moving the rotor. With a helical rotation of the rotor, which has begun under the action of this torque, the commutator switches the sections of the armature winding in such a manner that the direction of the torque be maintained unchangeable.

The above described arrangement of the electric motor of the invention allows the ranges of speed control of the helical movement of the rotor to be considerably expanded, said control being effected by simple conventional means utilized in the operation of d.c. electric machines.

INDUSTRIAL APPLICABILITY

The invention can be employed in drives which require the combination of rectilinear movement of a movable member with the rotation thereof around an axis coinciding with the direction of rectilinear movement thereof.

One of the important fields of use of the present invention is in the electric drive of industrial robots wherein, besides the above requirements, it is necessary to ensure a smooth speed control of the helical movement of the working member within a wide range, and a precise positioning of this working member.

We claim:

1. An electric motor comprising a stator having a main helical magnetic core with grooves; an armature positioned within said grooves of said main helical magnetic core of said stator; a rotor disposed within a bore of said stator; main salients forming a main magnetic field and disposed along a helical line around the rotor, the length of the main salients being equal to $\alpha\delta\cdot\tau$, and the distance between main salients being $(2-\alpha\delta)\tau$, where $\alpha\delta$ is a coefficient of a rated pole arc and $\tau$ is a pole pitch of the motor; wherein the improvement comprises said main helical core including an additional groove, an excitation winding being positioned in said additional groove, and the portions of each turn of the helical core, on which said armature and said excitation winding are positioned, having a length which provides axial alignment of the grooves, in which the armature is positioned, within all the turns of said main magnetic core.

2. An electric motor as claimed in claim 1, wherein a first region of each turn of the main magnetic core, on which the armature is disposed, has a length equal to an even number of pole pitches, and a second region of each turn of the main magnetic core, on which the excitation winding is disposed, has a length equal to an odd number of pole pitches of the motor.

3. An electric motor as claimed in claims 1 or 2, wherein the stator is provided with an additional helical magnetic core which is identical to the main magnetic core, both magnetic cores being disposed to balance the forces of one-side magnetic attraction between the rotor and the stator, and longitudinal axes of grooves for placing the armature coinciding in both the magnetic cores; and said rotor being provided with additional salients identical to the main salients and disposed relative thereto in the same manner as mutually disposed main and additional magnetic cores of the stator.

4. An electric motor as claimed in claim 1, wherein the main magnetic core of the stator is provided with two turns whereon are located $4n$ ($n=4, 6, 8, 10 \ldots$) pole pitches of the motor, the additional grooves for the excitation winding being provided on middle regions of the main magnetic core, whose length is a multiple of four pole pitches of the motor, and the armature winding is laid on two extreme regions of each of the two turns of the main magnetic core of the stator, the length of said regions being the same.

5. An electric motor as claimed in claim 4, wherein on a middle portion of the main magnetic core of the stator a non-magnetic separator is mounted.

6. An electric motor as claimed in claim 3, wherein each of the magnetic cores of the stator has a length equal to half a circumference and an additional groove, the excitation winding is common for both magnetic cores and is provided longitudinally in each magnetic core, and the grooves of the armature winding are provided over the whole inner surface of the magnetic cores of the stator, the main salients and the additional salients being disposed on the rotor in staggered rows.

* * * * *